(12) United States Patent  
Dong

(10) Patent No.: US 12,228,261 B2  
(45) Date of Patent: Feb. 18, 2025

(54) VEHICLE LIGHTS WITH SPLIT LENS

(71) Applicant: Xin Dong, Bastrop, TX (US)

(72) Inventor: Xin Dong, Bastrop, TX (US)

( * ) Notice: Subject to any disclaimer, the term of this patent is extended or adjusted under 35 U.S.C. 154(b) by 0 days.

(21) Appl. No.: 18/500,992

(22) Filed: Nov. 2, 2023

(65) Prior Publication Data

US 2024/0151378 A1 May 9, 2024

Related U.S. Application Data

(60) Provisional application No. 63/422,428, filed on Nov. 3, 2022.

(51) Int. Cl.
| | |
|---|---|
| *F21S 41/20* | (2018.01) |
| *F21S 41/143* | (2018.01) |
| *F21S 41/16* | (2018.01) |
| *F21S 41/29* | (2018.01) |
| *F21S 41/32* | (2018.01) |
| *F21Y 115/10* | (2016.01) |
| *F21Y 115/30* | (2016.01) |

(52) U.S. Cl.
CPC .......... *F21S 41/285* (2018.01); *F21S 41/143* (2018.01); *F21S 41/16* (2018.01); *F21S 41/295* (2018.01); *F21S 41/321* (2018.01); *F21Y 2115/10* (2016.08); *F21Y 2115/30* (2016.08)

(58) Field of Classification Search
CPC ........ F21S 41/20; F21S 41/285; F21S 41/295; F21S 41/143; F21S 41/16; F21S 41/32
See application file for complete search history.

(56) References Cited

U.S. PATENT DOCUMENTS

| | | | |
|---|---|---|---|
| 8,696,180 B2 | 4/2014 | Ishida et al. | |
| 10,260,699 B2 | 4/2019 | Bolander, Jr. | |
| 10,830,406 B2 | 11/2020 | Kurosu et al. | |
| 2009/0251915 A1* | 10/2009 | Boroczki | F21S 41/689 |
| | | | 362/512 |
| 2019/0301705 A1* | 10/2019 | Schickel | G02B 19/0028 |

FOREIGN PATENT DOCUMENTS

EP 3228927 B1 4/2021

* cited by examiner

*Primary Examiner* — Karabi Guharay  
(74) *Attorney, Agent, or Firm* — NZ CARR LAW OFFICE

(57) ABSTRACT

A vehicle light is disclosed. The vehicle light includes a first optical device and a second optical device. The first optical device and a light source are sealed in a housing. The second optical device is removably attached to the housing. The first optical device transmits the light rays from the light source into an intermediate pattern. The second optical device transmits the intermediate pattern to a target pattern. The second optical device may be switched to obtain a different target beam pattern or a different color.

20 Claims, 16 Drawing Sheets

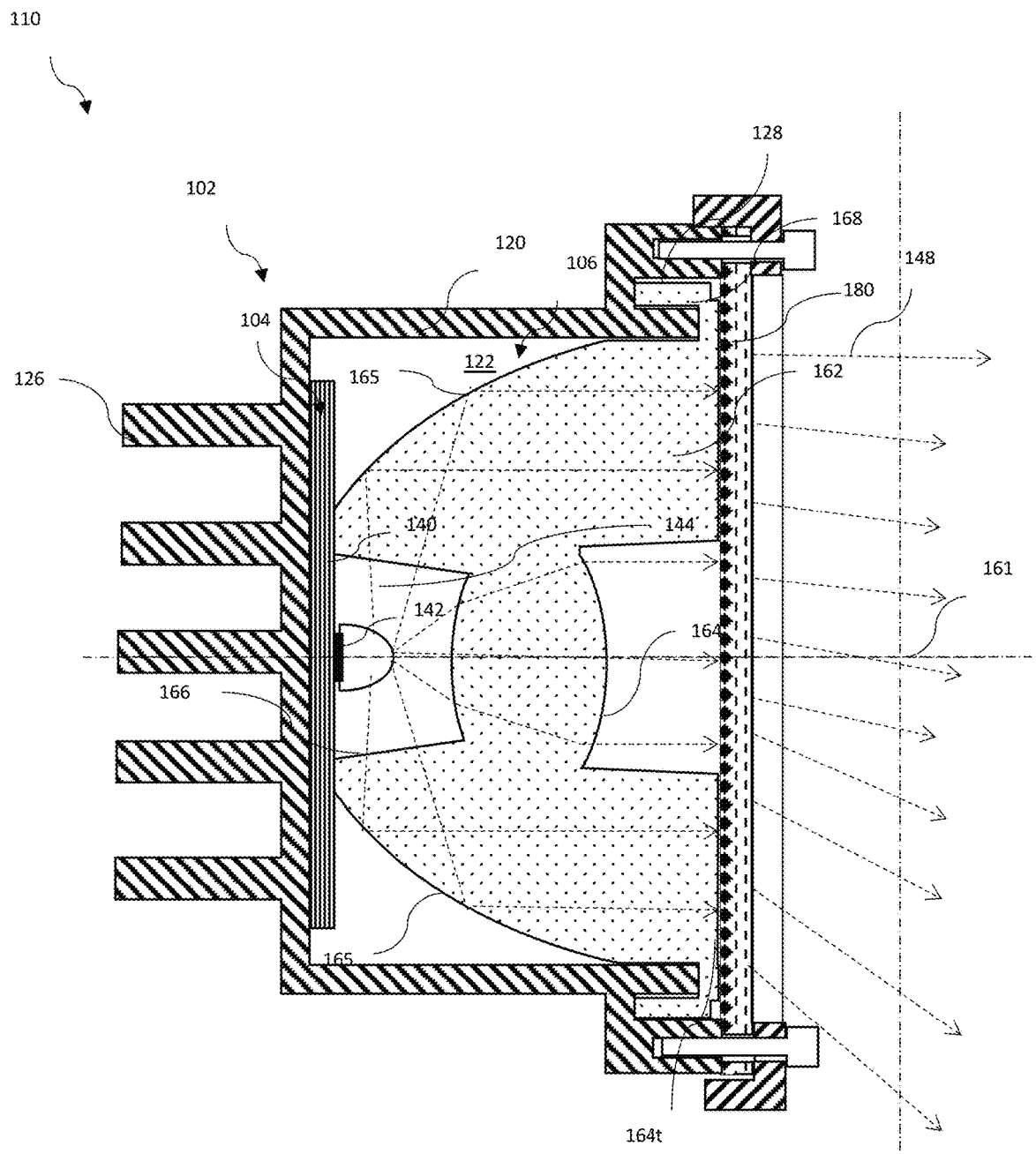
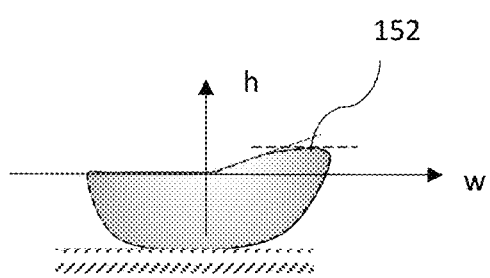
Fig. 1E
Fig. 1F

VEHICLE LIGHTS WITH SPLIT LENS

CROSS-REFERENCE TO RELATED APPLICATIONS

This application claims priority to U.S. Provisional Application Ser. No. 63/422,428 filed Nov. 3, 2022, which is incorporated by reference in its entirety.

FIELD OF DISCLOSURE

The present disclosure relates to vehicle lights. Particularly, embodiments of the present disclosure relate to vehicle lights with an optical assembly having two separate optical elements.

BACKGROUND OF THE DISCLOSURE

Motor vehicles contain numerous lighting devices for both interior and exterior illumination. Typically, there are various standards and requirements by government or insurance agencies to regulate these functions for safety reasons. For example, government standards require a headlamp to form certain beam patterns for driving safety. The beam patterns are realized using specific optical devices in the vehicle, such as reflectors and/or lenses and by aligning light sources with the optical devices.

Conventionally, a light source in a vehicle light is sealed to the corresponding optical device to shield the light source from the environment. As a result, a vehicle light is only capable of generate one beam pattern. And if any part of the light source and the optical device is damaged or worn, the entire vehicle light needs to be replaced.

Embodiments of the present disclosure provide an improved vehicle light with flexibility of generating different beam patterns and replacing individual optical components.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

FIGS. 1A-1H schematically demonstrate a vehicle light according to the present disclosure.

FIGS. 3A-3I schematically demonstrates a vehicle light according to the present disclosure.

Figure 1A:
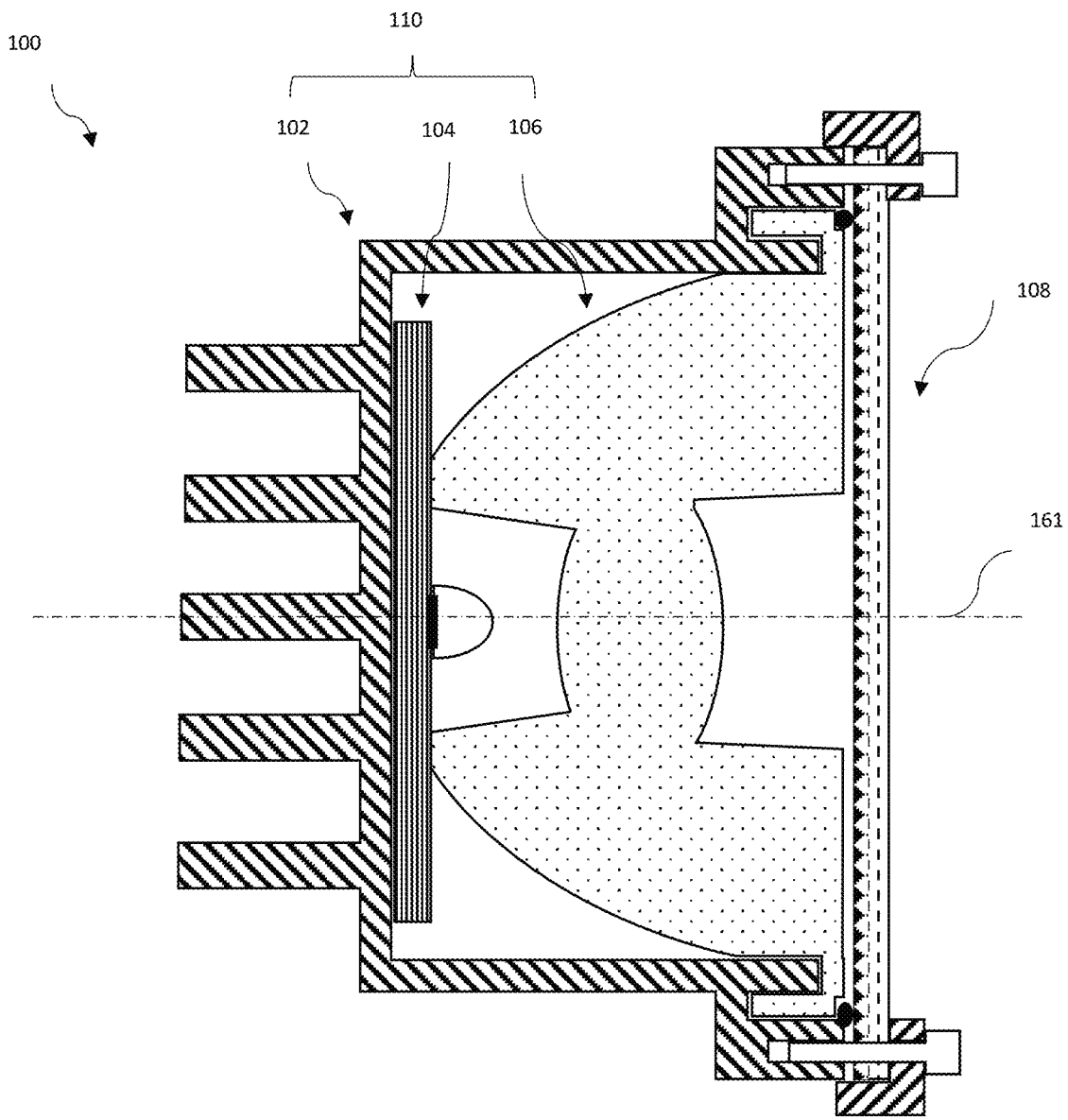

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present disclosure relate to a vehicle light. Particularly, embodiments of present disclosure relate to a vehicle light with a split optical assembly. The term "vehicle" or other similar term used herein are inclusive of motor vehicles in general such as land vehicles, watercrafts and aircraft that are propelled by motors, which may be driven by fuels derived from resources other than petroleum, electricity, hydrogen, or combinations thereof. For example, vehicles may include passenger automobiles such as sedans, sport utility vehicles, buses, trucks, and the like, transport vehicles such as commercial fleet vehicles, industrial vehicles such as tractors, skeet gears, excavators, and the like, as well as powersports vehicles.

FIGS. 1A-1H schematically demonstrate a vehicle light 100 according to the present disclosure. The vehicle light 100 may be installed on a vehicle and used as an exterior light device for a motor vehicle. The vehicle light 100 is an exterior light configured to a beam pattern set forth in any current global vehicular lighting regulation, e.g., the current U.S. NHTSA a No. 108.

FIG. 1A is a schematic section view of the vehicle light 100. The vehicle light 100 includes a base unit 110 and a functional optical unit 108. The base unit 110 includes a housing 102, a light source unit 104 disposed in the housing 102, and a base optical unit 106 disposed in front of the light source unit 104. In some embodiment, the base unit 110 may be a sealed unit. The base unit 110 is configured to output an intermediate beam pattern. The function optical unit 108 is over the base optical unit 106 of the base unit 110. The function optical unit 108 may be designed to project the intermediate beam pattern into a target beam pattern. Different functional optical unit 108 may be interchangeably attached to the base unit 110 to generate different target beam patterns.

Figure 1B:
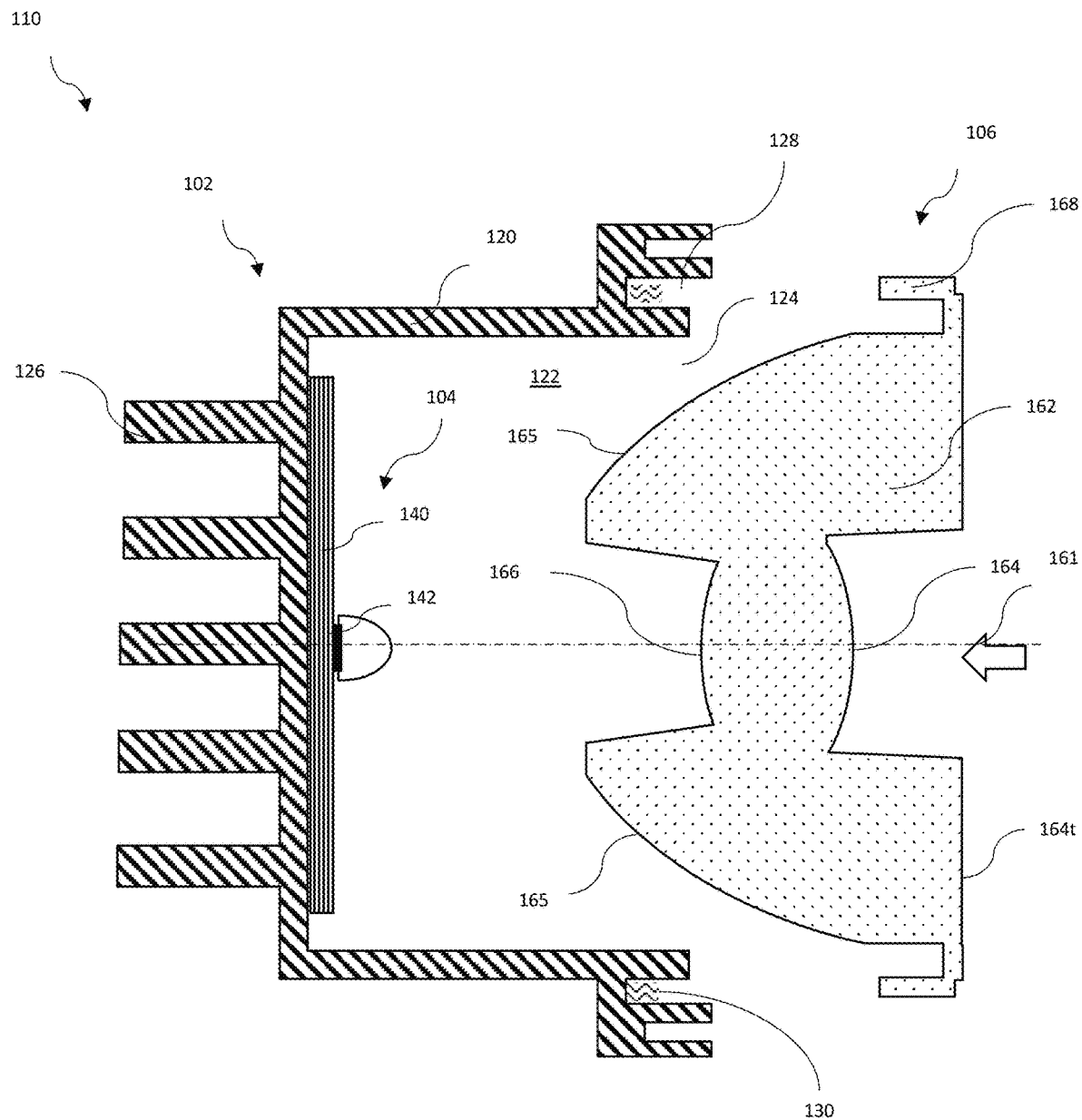
Figure 1C:
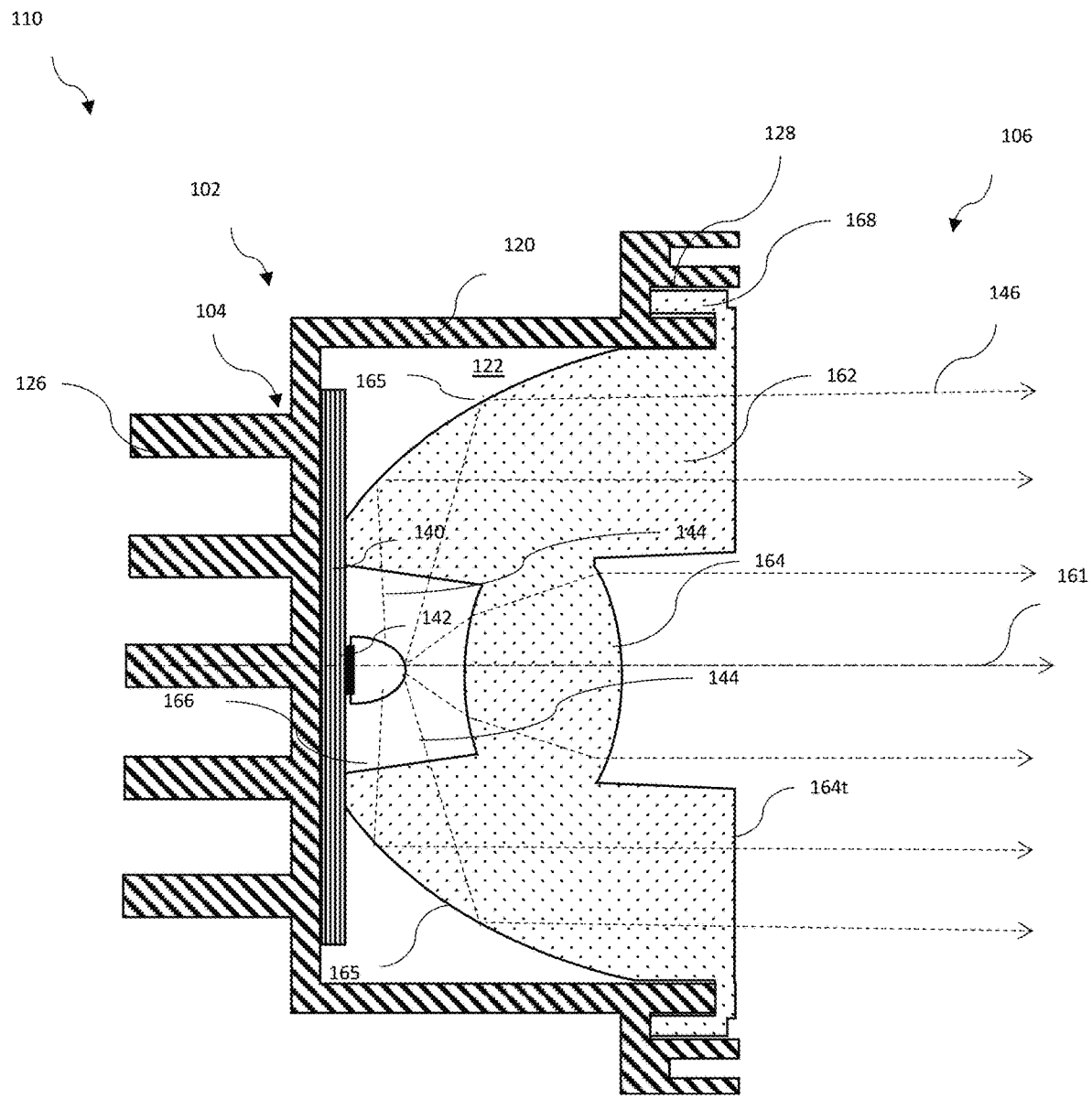
Figure 1C:
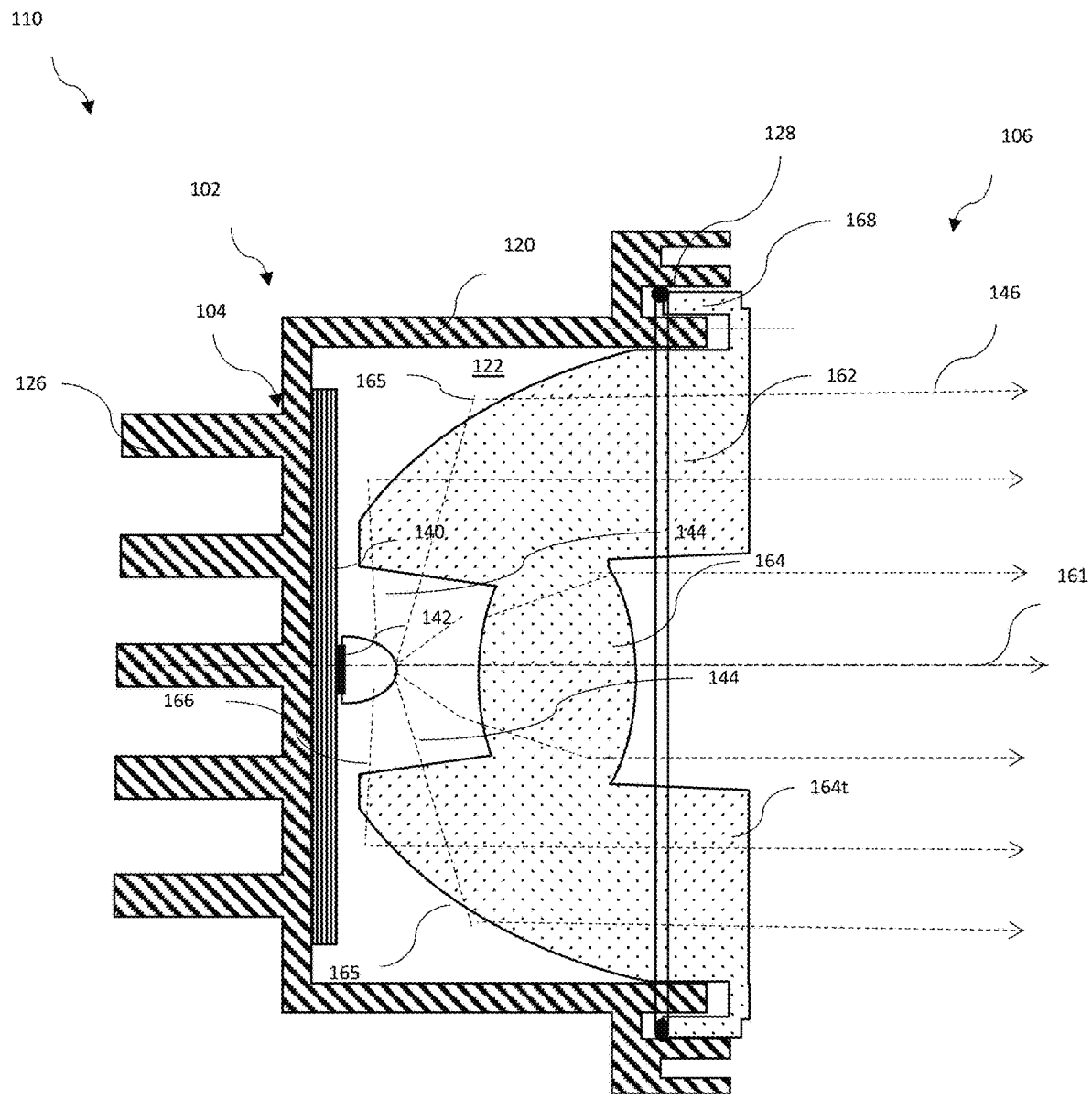

FIG. 1B is a schematic sectional view of the base unit 110 of the vehicle light 100 during assembly. FIG. 1C is a sectional view of the base unit 110 showing light paths. The base unit 110 is assembled by attaching the light source unit 104 to the housing 102 and sealing the base optical unit 106 to the housing 102. As shown in FIG. 1B, the housing 102 may include a body 120. The body 120 defines an inner volume 122 and an opening 124. In some embodiments, the body 120 may be formed from a material that is structurally strong with good heat conductivity to provide cooling to the light source unit 104 disposed therein. The housing 102 may include some cooling blades 126 in contact with the body 120. In some embodiments, the cooling blades 126 and the body 120 may be formed in a unitary body. Alternatively, the cooling blades 126 may be attached to the body 120. The body 120 may include a groove 128 formed around the opening 124 for receiving the base optical unit 106.

The light source unit 104 may include a printed circuit board (PCB) 140 having one or more light source 142. In some embodiments, the one or more light sources 142 may be one or more light-emitting (LED) diodes, laser diodes, or combinations thereof. The printed circuit board 140 may include drive circuits and/or control circuits to the one or more light sources 142. In some embodiments, the printed circuit board 140 is attached to the body 120 such that the body 120 and the cooling blades 126 may provide cooling to the printed circuit board 140 and the light sources 142. The printed circuit board 140 may be fixedly attached to the body 120 to position the one or more light sources 142 in alignment with the base optical unit 106.

The base optical unit 106 may include a lens 160. When assembled, the lens 160 fills the opening 124 of the housing 102. In some embodiments, the lens 160 may be a unitary lens formed from molding. The lens 160 may be formed from rigid transparent material, such as glass and plastic, including, but not limited to polycarbonate (PC), poly(m- ethyl methacrylate) (PMMA), polystyrene (PS), cyclic olefin polymer (COP), and cyclic olefin copolymer (COCP).

In some embodiments, the lens 160 may be formed from flexible transparent material, such as optical grade silicone. Optical silicone is rubber-like, soft and flexible. Optical silicone can be molded accurately in a large format optic in a single mold process. Optical silicone optics are formed with a thermoset process, which utilizes a catalyst along with heat input to cure the optic into its final configuration. Rather than shrink, optical silicone effectively expands during the molding process, thereby enabling a highly accurate replication of the optical surface, including very thin optical elements in a single molding step. Additionally, optical silicone has a significantly higher temperature resistance than other common optical-grade plastics. The higher temperature resistance makes the optical silicone particularly suitable in LED applications where the optical element and the LED source has close proximity. Silicone optics may be placed directly over high temperature LED light sources, thereby significantly improving optical performance while precluding temperature degrading over time. In some embodiments, the adhesive 130 may be omitted when the lens 160 is formed from a flexible material, such as silicone.

The lens 160 may be shaped to achieve a desired optical function. The lens 160 may have an input surface 166 and an exit surface 164. The input surface 166 and the exit surface 164 may be formed on opposite sides of the lens 160. When assembled, the input surface 166 faces the light source 142 and the exit surface 164 faces an exterior of the housing 102. In some embodiments, the input surface 166 may include various sections to collect light rays 144 from the light source 142. In some embodiments, the lens 160 may include one or more reflective surfaces 165 configured to reflect light rays bouncing within the lens 160 towards the exit surface 164. In some embodiments, a mirror coating may be formed on the reflective surfaces 165 to improve transmission efficiency of the lens 160. When assembled, the input surface 166 surrounds the light source 142. The reflective surfaces 165 may be disposed within the housing 102. When assembled, the exit surface 164 is positioned in the opening 124 formed through the exterior of the housing 102. The exit surface 164 may include one or more sections. In some embodiments, the exit surface 164 may include a top section 164t. The top section 164t may be a planar surface.

In some embodiments, the lens 160 may include a connection feature 168 shaped to position the lens 160 in a target location of the housing 102. In some embodiments, the connection feature 168 may be an outer rim configured to fit with the groove 128 in the housing 102. When the connection feature 168 is inserted in the groove 128, the light source 142 is aligned with an optical axis 161 of the lens 160. In some embodiments, the connection feature 168 and the housing 102 form a sealed connection so that the light source 142 and the printed circuit board 140 are sealed within the housing 102. In some embodiments, an adhesive 130 may be applied to the groove 128 and/or the connection feature 168 prior to inserting the connection feature 168 into the groove 128. The adhesive 130 would cure and form an airtight and watertight connection between the lens 160 and the housing 102. Alternatively, the adhesive 130 may be replaced by any suitable sealing means, such as a sealing ring secured therein.

After assembled, the base unit 110, which includes the housing 102, the light source unit 104 and the base optical unit 106, form a sealed unit. In some embodiments, the base unit 110 is configured to project the light rays 144 from the light source 142 to an intermediate beam pattern. In some embodiments, the intermediate beam pattern may be a bunch of parallel beams. In some embodiments, the bunch of parallel beams may be along the optical axis 161 of the lens 160.

FIG. 1C schematically illustrates the light paths within the base unit 110 from the light rays 144 to exit beams 146. The exit beams 146 form the intermediate beam pattern with a bunch of parallel beams.

The base optical unit 106 and the function optical unit 108 according to embodiments of the present disclosure form an optical assembly to achieve a target beam pattern. Even though the base optical unit 106 described above is designed to project parallel beams and the function optical unit 108 is designed to distribute parallel beams into the target beam pattern, the base optical unit 106 and the function optical unit 108 may be designed in any suitable arrangement to achieve the target beam pattern.

Figure 1D:
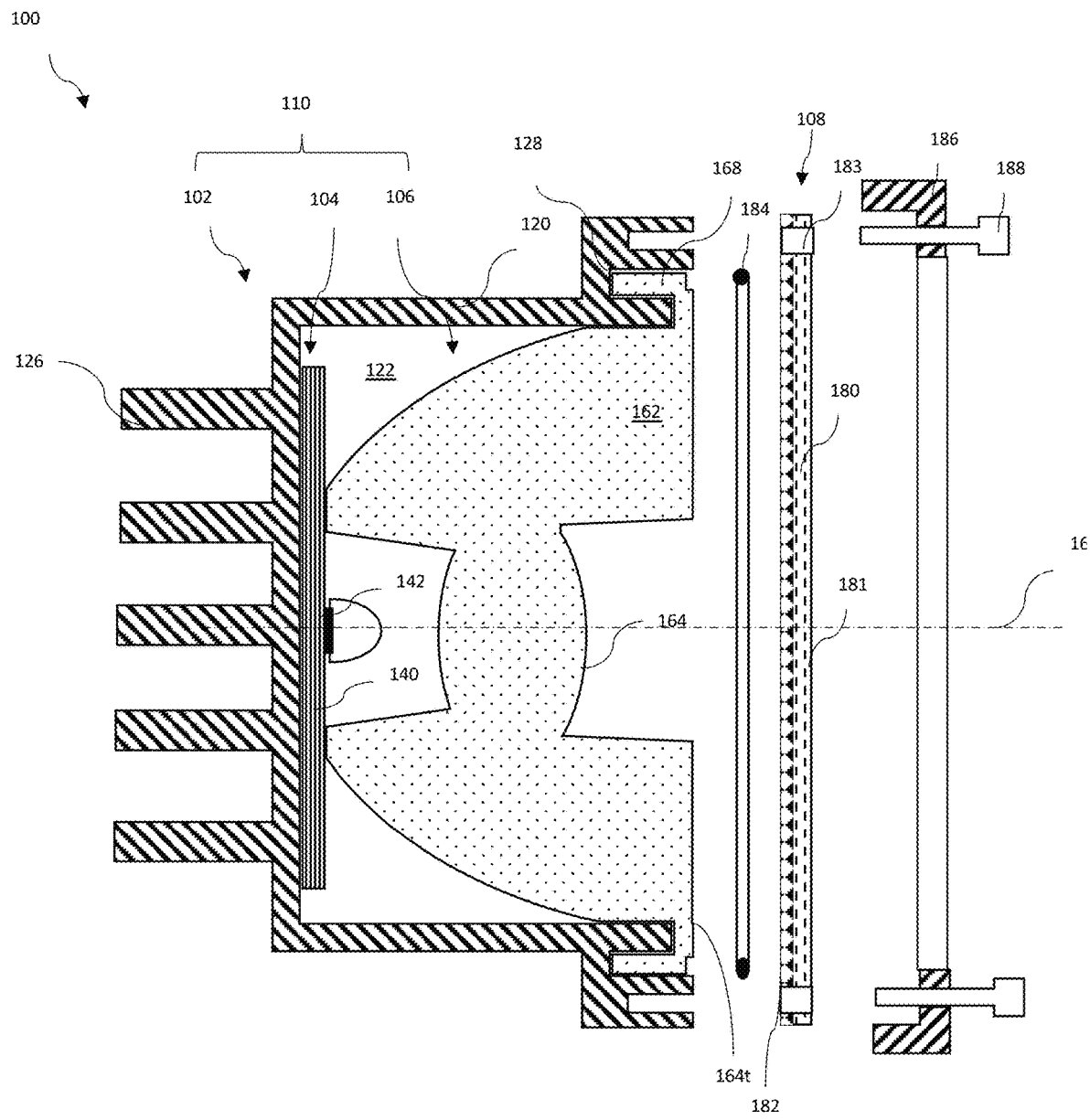

FIG. 1D is a schematic exploded view of the vehicle light 100 showing components of the function optical unit 108. The function optical unit 108 includes a functional lens 180. The functional lens 180 may be a transparent panel having an input surface 182 and an exit surface 181. In some embodiments, the functional lens 180 may be an injection molding having patterns formed on at least one of the input surface 182 and the exit surface 181 to generate a target beam pattern. In some embodiments, the functional lens 180 may be a transparent panel in a form of sheeting. The input surface 182 and the exit surface 181 are substantially parallel to each other and may have patterns to achieve optical function. The shape, dimension, patterns, and/or surface features may be designed to distribute input beams from the input surface 182 to a target pattern. When assembled, the input surface 182 of the functional lens 180 faces the exit surface 164 of the lens 160 in the base unit 110. The exit beams 146 enter the input surface 182, transmit through the functional lens 180, and exit the exit surface 181 in the target pattern.

The functional lens 180 may be formed from any suitable material. The functional lens 180 may be formed from transparent material, such as glass, plastic, including, but not limited to polycarbonate (PC), poly (methyl methacrylate) (PMMA), polystyrene (PS), cyclic olefin polymer (COP), cyclic olefin copolymer (COCP), and optical silicone. In some embodiments, when the functional lens 180 is formed from a flexible material, such as silicone, sealant may be omitted between the functional lens 180 and the body 120. In some embodiments, the functional lens 180 and the lens 160 may be formed from the same material. In other embodiments, the functional lens 180 and the lens 160 may be formed from different materials. For example, the lens 160 may be formed from optical grade silicone, and the functional lens 180 may be formed from plastic. In some embodiments, the functional lens 180 may include suitable pigments to achieve desired color, for example, red, yellow, blue, suitable for signals, warnings, decoration, and etc.

In some embodiments, the functional optical unit 108 may be removably attached to the base unit 110 by a suitable fastening means, such as screws, clamps, bolts and nuts, adhesives, magnets, clips, threaded connection, and the like. In the embodiment of FIG. 1A, the functional lens 180 is attached to the base unit 110 by screws 188. The functional lens 180 may include through holes or notches 183. The screws 188 may be secured to the housing 102 via the through holes or notches 183.

In some embodiments, the function optical unit 108 may include a sealing ring 184 disposed between the lens 160 and the functional lens 180 along an edge of the functional lens

180. The sealing ring 184 may be formed from elastomers. The sealing ring 184 seals the gaps between the lens 160 and the functional lens 180 to prevent exterior elements. In some embodiments, the functional optical unit 108 further includes an edge ring 186 disposed around the functional lens 180. The edge ring 186 may provide structural support and protection to the functional lens 180.

In some embodiments, two or more functional lens 180 may be packaged with one base unit 110, allowing the vehicle light 100 to function as different vehicle lights. In some embodiments, the functional lens 180 may include notches or markers for easy alignment during installation and replacement. The fastening means, such as the screws 188, may be designed for repeated tightening and loosening, thereby, switching or replacing the function lens 180 as needed.

As discussed above, optical assembly of the vehicle light 100 is split into the lens 160 in the base unit 110 and the functional lens 180. The lens 160 transmits the light rays 144 from the light source 142 into an intermediate pattern and the functional lens 180 transmits the intermediate pattern to a target pattern. The functional lens 180 in the functional optical unit 108 may be changed to obtain different beam pattern or a different color.

The vehicle light 100 may be configured to perform various functions, such as stop lamp functions, tail lamp functions, headlamp functions, daytime running light functions, dynamic bending light functions, and fog lamp functions. Many of these functions, such as headlamp functions, are governed by government standards and requirements for safety reasons. In particular, government standards may require vehicle lights to irradiate certain beam patterns according to the lighting function. A beam pattern is a spatial distribution of beam intensity. For example, a vehicle headlamp must irradiate a low beam pattern or a high beam pattern to secure the driver's view ahead of the vehicle in a low light condition. The headlamp normally maintains the low beam pattern to prevent a dazzle effect of the drivers of oncoming vehicles driving in the opposite direction or the drivers of preceding vehicles. During high-speed driving or in a low light area, the headlamp forms the high beam pattern to ensure safe driving.

By choosing different target patterns, the vehicle lights 100 according to the present disclosure may be used as headlamps, auxiliary driving lamps, or front fog lamps. The target pattern is achieved using the combination of the lens 160 in the base unit 110 and the functional lens 180 disposed over the base unit 110. The corresponding target patterns meet the corresponding government standard. For example, the vehicle light 100 may be used as headlamps when the lens 160 and the functional lens 180 generate a target pattern meets a government standard, such as current U.S. NHTSA Motor Vehicle Safety Standard No. 108. Alternatively, the vehicle light 100 may be used as an auxiliary driving lamp when the lens 160 and the functional lens 180 generate a beam pattern that meets SAE standard J581 for Auxiliary Upper Beam Lamps. The vehicle light 100 may be used as a front fog lamp when the lens 160 and the functional lens 180 generate a beam pattern that meets the SAE Standard J583 for Front Fog Lamp.

Conventional vehicle lights include a light source and an optical assembly to generate a target beam pattern from the light source. For exterior lighting devices, the light source and the optical assembly are typically sealed or otherwise permanently attached to protect the light source from environment elements. As a result, vehicle lights have fixed functions, and the light source and the optical assembly are replaced together. The functional lens 180 in the functional optical unit 108 may be replaced and changed independently from the base unit 110, therefore, providing flexibility and reducing cost of ownership.

The split lens configuration provides flexibility to the vehicle light 100. By applying different functional lens 180 over the same base unit 110, the vehicle light 100 may project different target patterns and/or different colors to function as desired. FIGS. 1E-1H schematically demonstrate the vehicle light 100 with two different target patterns.

FIG. 1E is a schematic view of the vehicle light 100 with the functional lens 180 designed to generate a low beam pattern 152. In the embodiment of FIG. 1E, the functional lens 180 is designed to transmit the intermediate pattern from the base unit 110 to light beams 148 which form the low beam pattern 152 at a vertical plane 150 in front of the vehicle light 100.

FIG. 1F schematically illustrates the low beam pattern 152 regulated by government standards so that the light from the low beam pattern 152 is focused on the proper position and does not create glare or a safety hazard for oncoming traffic. For example, the low beam pattern 152 illuminates the road and surroundings ahead of a vehicle when meeting or closely following other vehicles. Most standards require that the low beam pattern 152 projects an asymmetrical pattern to provide adequate forward and lateral illumination and control glare by limiting light directed towards preceding or oncoming drivers.

Figure 1G:
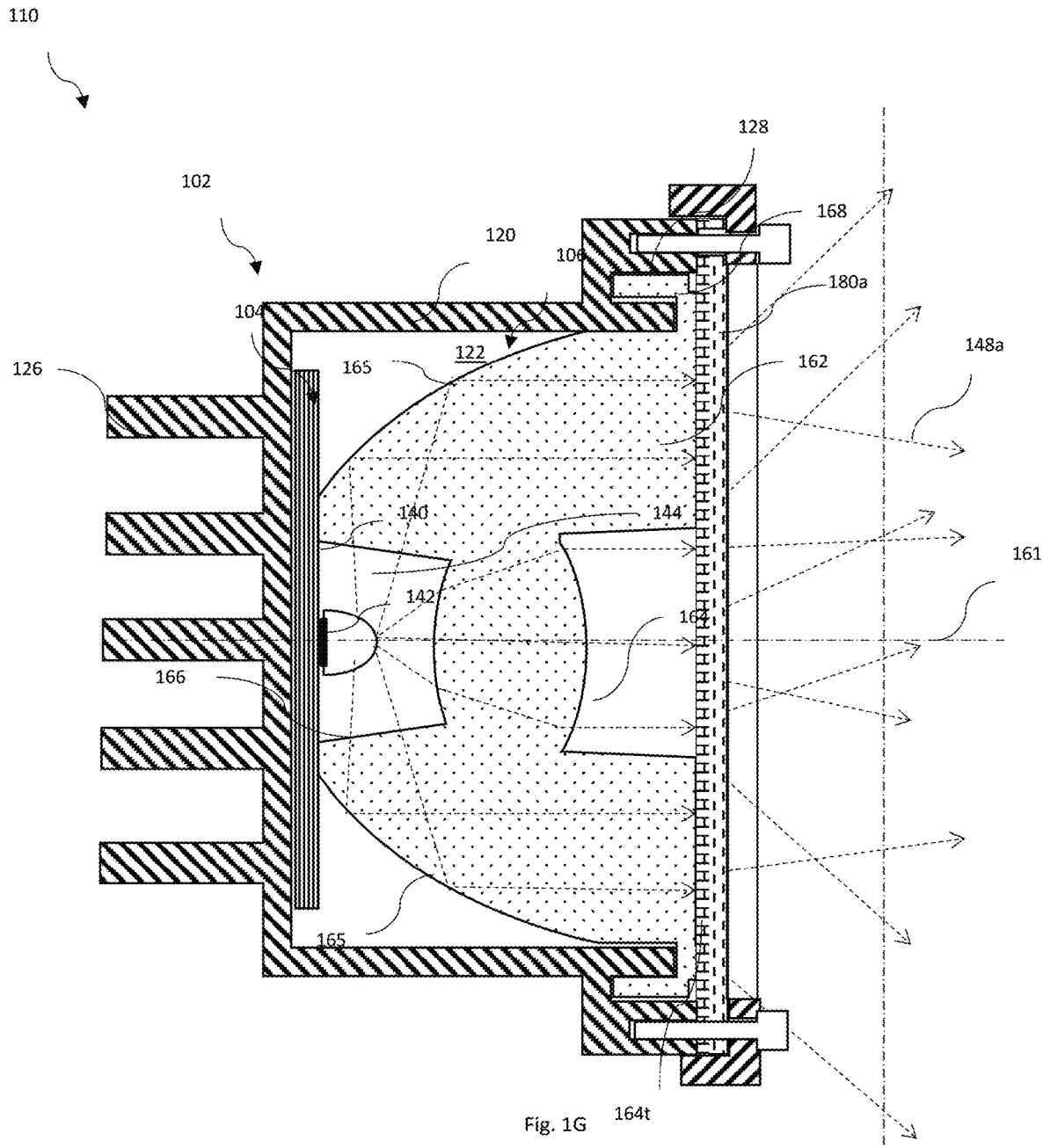
Figure 1H:
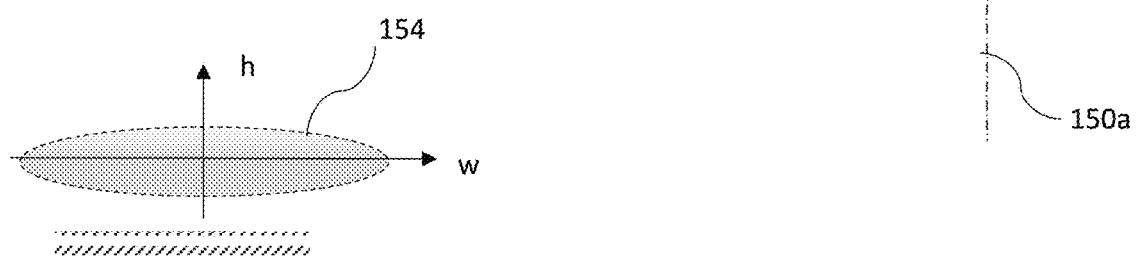

FIG. 1G is a schematic view of the vehicle light 100 with a functional lens 180a designed to generate a fog pattern 154. In the embodiment of FIG. 1G, the functional lens 180a is designed to transmit the intermediate pattern from the base unit 110 to light beams 148a which form the fog pattern 154 at a vertical plane 150a in front of the vehicle light 100. FIG. 1H schematically illustrates the fog pattern 154 regulated by government standards so that the light from the fog pattern 154 is randomly distributed at a wide symmetrical range in front of a vehicle.

The split lens configuration also extends lifespan of the vehicle light 100. Since the functional lens 180 is disposed over the base unit 110, the lens 160 and the light source unit 104 are removed from the exterior elements, such as dust, particle, moisture, extreme temperatures, highspeed foreign debris during driving, therefore, are unlikely to be damaged during operation. In case the functional lens 180 is damaged, the vehicle light 100 may be easily repaired by replacing a new functional lens while the base unit 110 may take advantage of the long lifespan of the LED light source.

Figure 2:
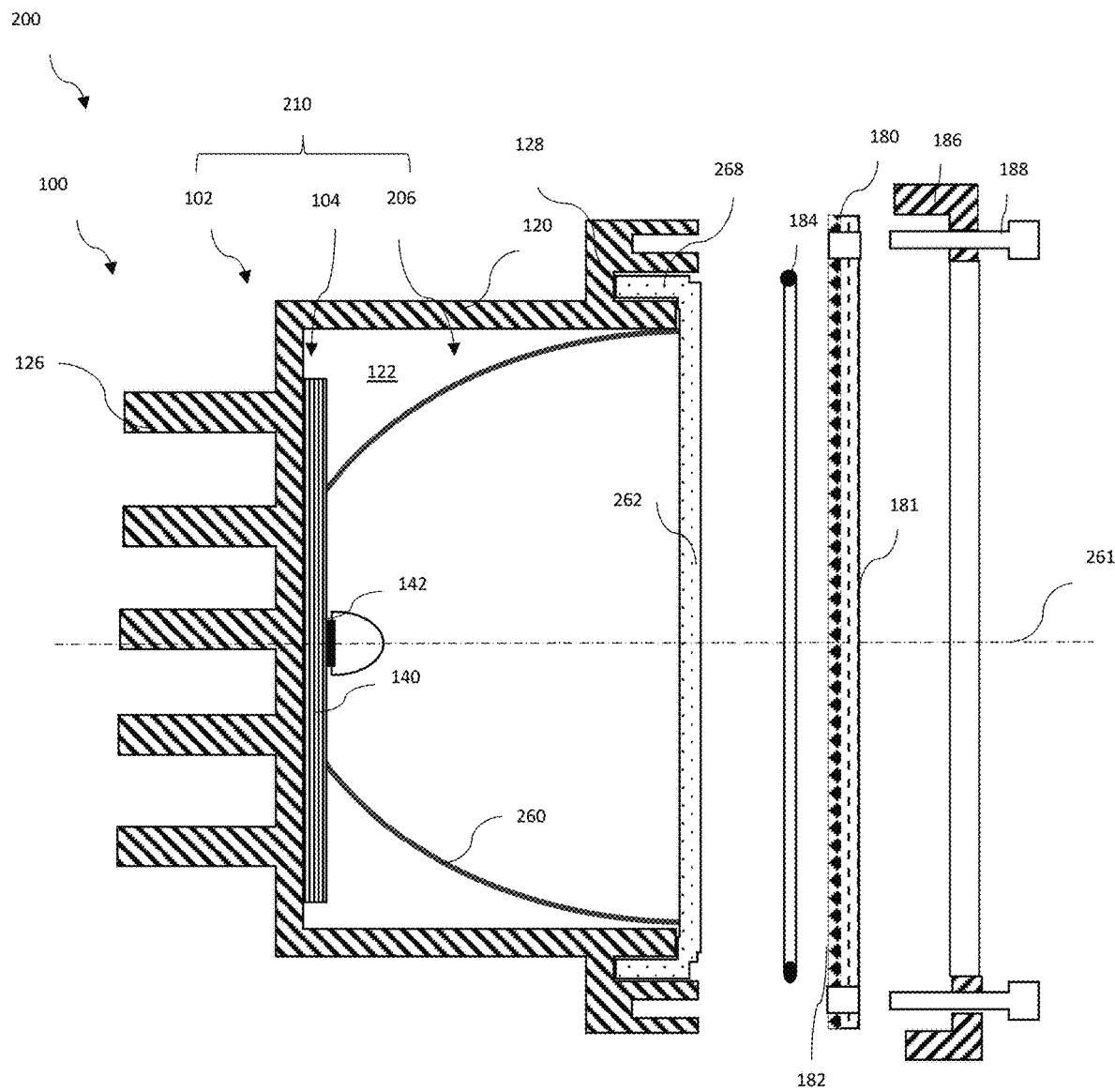
FIG. 2 schematically demonstrates a vehicle light according to the present disclosure.

Even though the base optical unit 106 described above includes the lens 160, the base optical unit 106 may include reflectors, lenses, or a combination thereof. FIG. 2 schematically demonstrates a vehicle light 200 according to the present disclosure. The vehicle light 200 is similar to the vehicle light 100 except that the vehicle light 200 includes a base unit 210 having a base optical unit 206 in place of the base optical unit 106. The base optical unit 206 includes a reflecting cup 260 and a transparent cover 262. The reflecting cup 260 is attached to the housing 102 so that the light source 142 is aligned with an optical axis 261 of the reflecting cup 260. The reflecting cup 260 opens towards the opening 124. The transparent cover 262 be disposed over the reflecting cup 260. The transparent cover 262 may include a rim 268 shaped to match the groove 128 of the housing 102. The rim 268 of the transparent cover 262 may be inserted in the groove 128 in the body 120 to seal the base unit 210. Different functional lens 180 may be attached to the base unit 210 to generate different beam patterns.

Even though the vehicle light 100 or 200 includes one light source and one set of optical devices, embodiments of the present disclosure may be applied to complex lights, which include two or more light sources with corresponding optical devices. An exemplary complex light including four light sources, also known as quad light, is described in FIGS. 3A-3I.

FIGS. 3A-3I schematically demonstrates a vehicle light 300 according to the present disclosure. Similar to the vehicle lights 100 and 200, the vehicle light 300 also includes the split lens configuration according to the present disclosure. The vehicle light 300 may be used as an exterior light and configured to a beam pattern set forth in any current global vehicular lighting regulation.

Figure 3A:
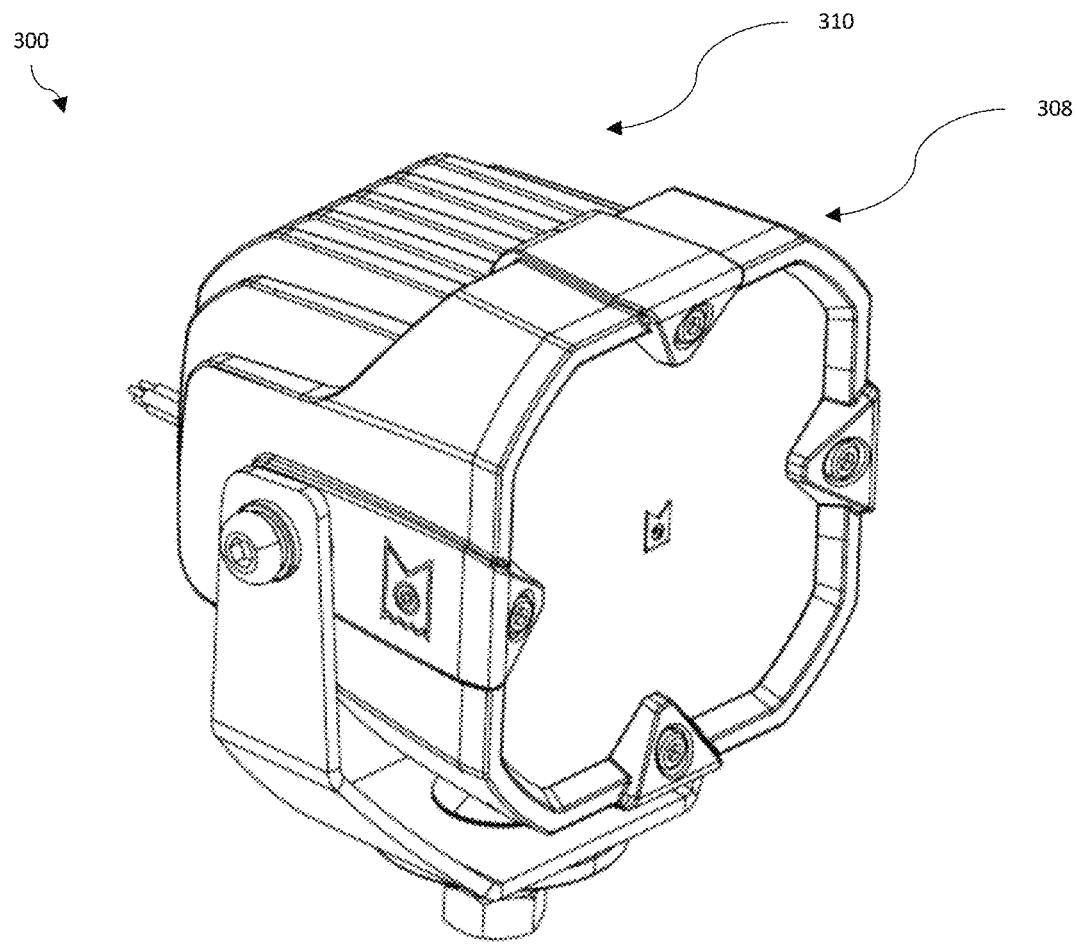
Figure 3B:
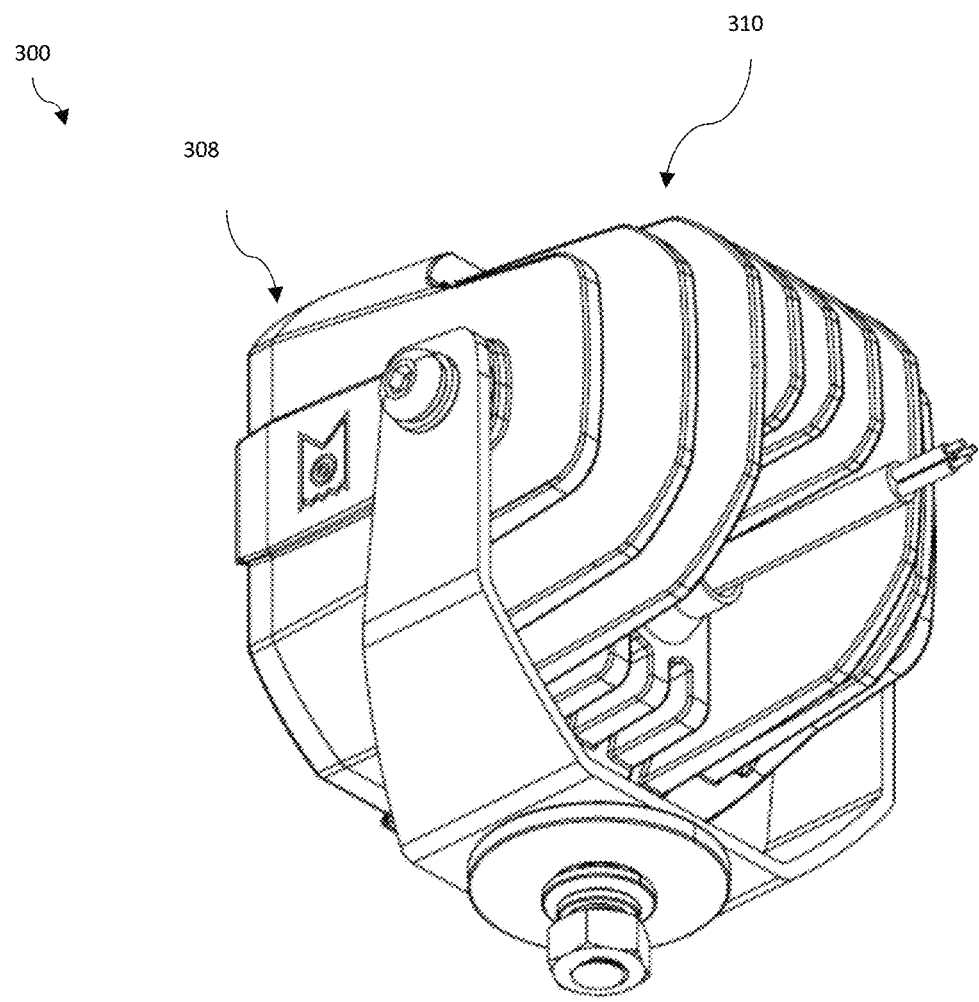
Figure 3C:
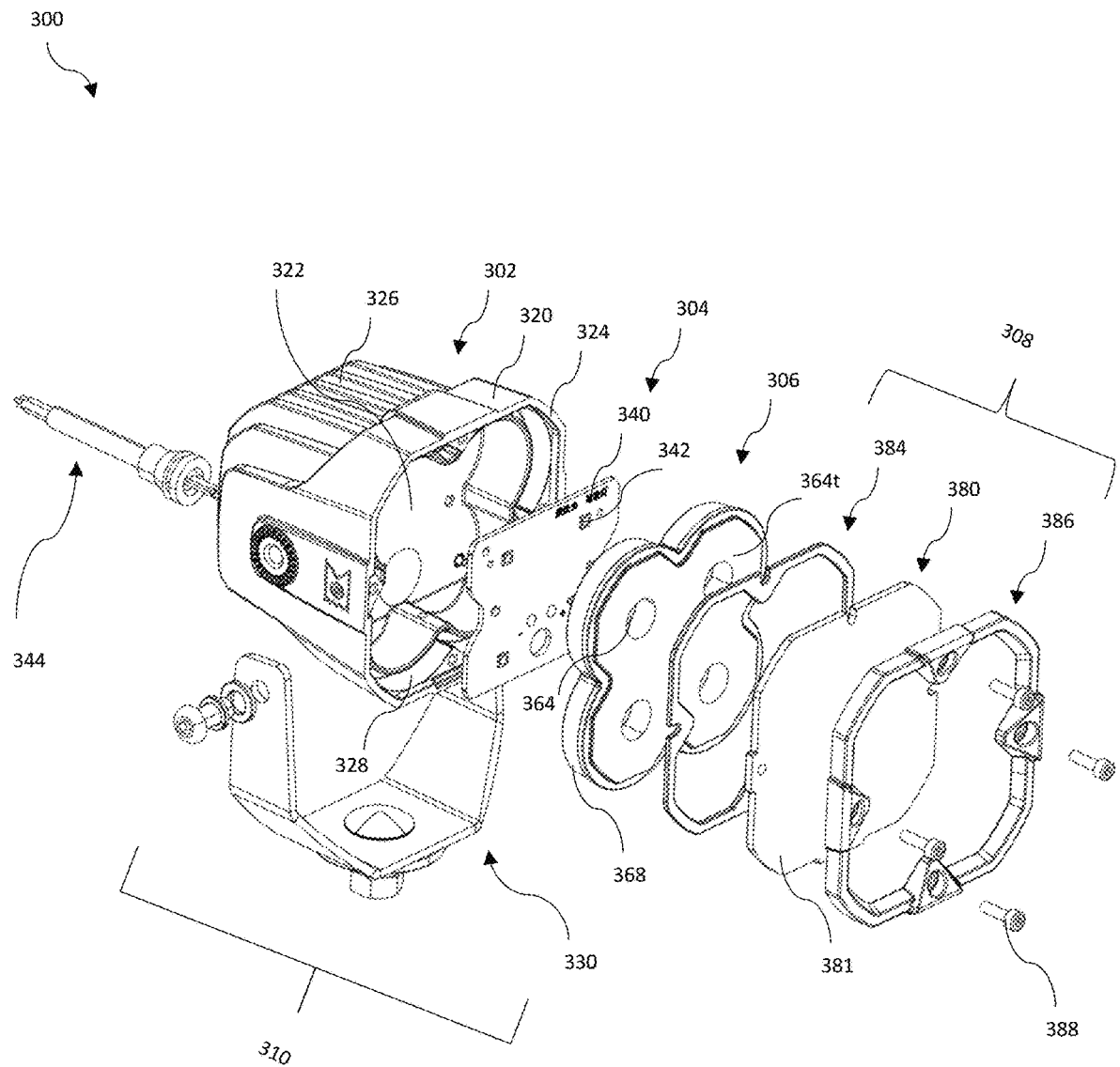
Figure 3D:
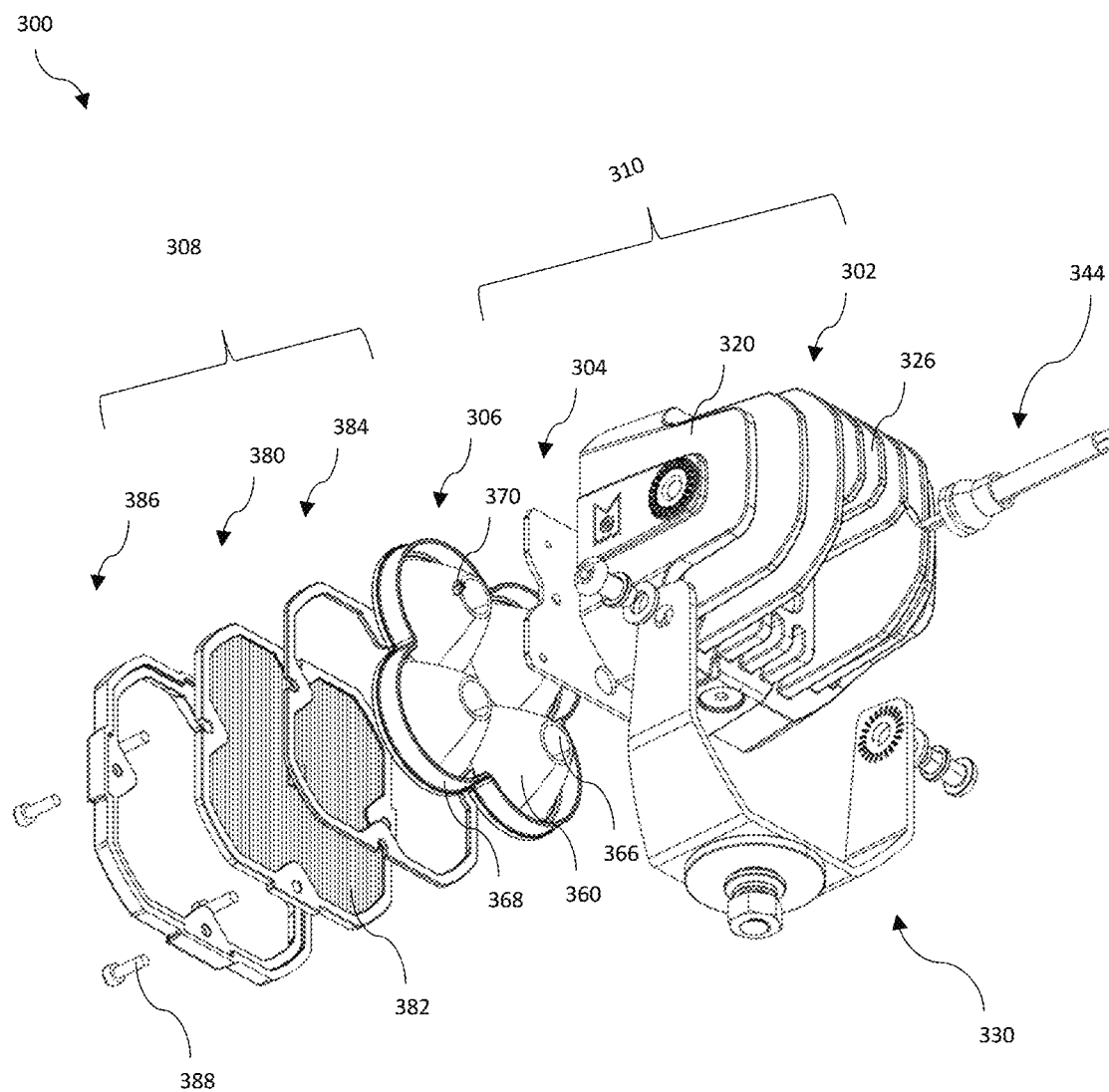
Figure 3E:
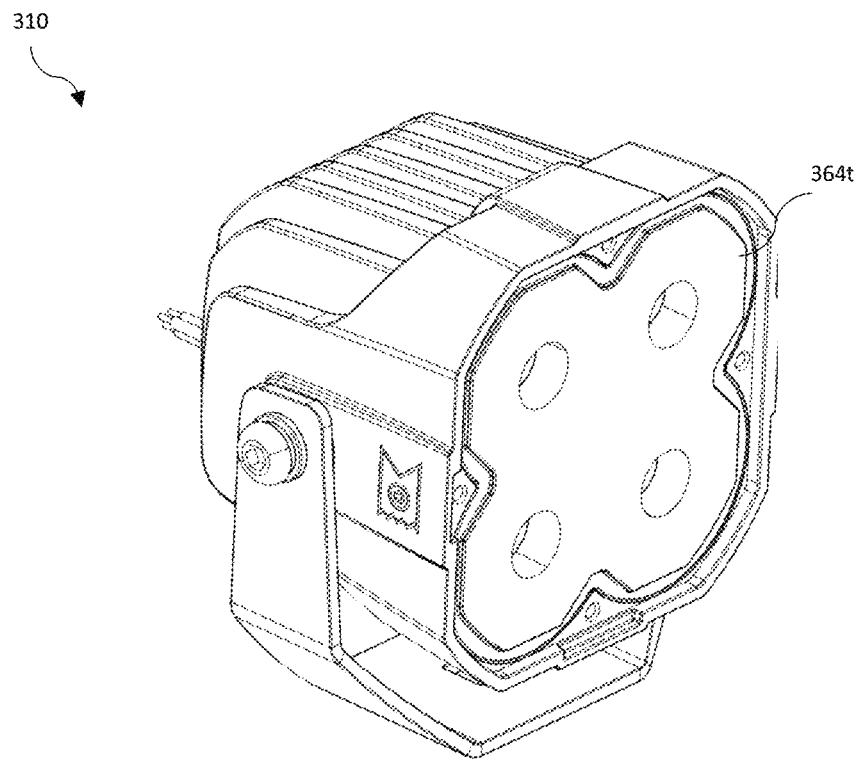
Figure 3F:
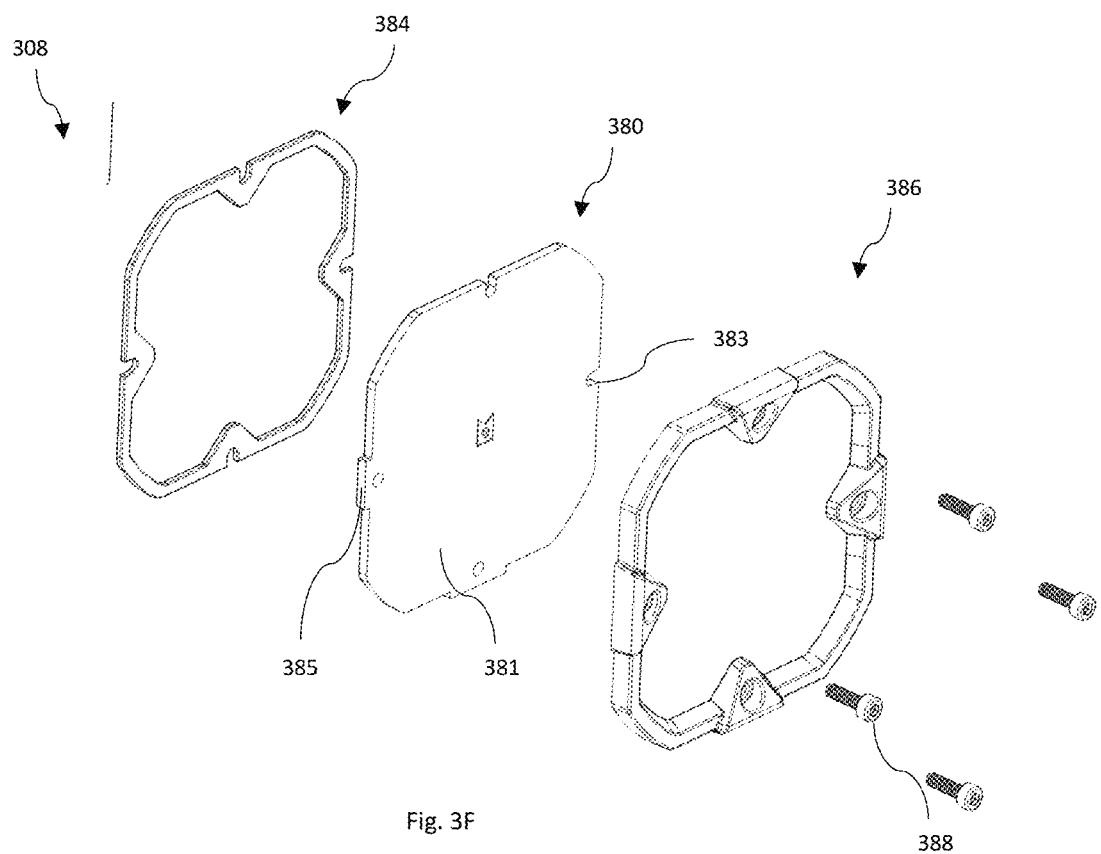
Figure 3G:
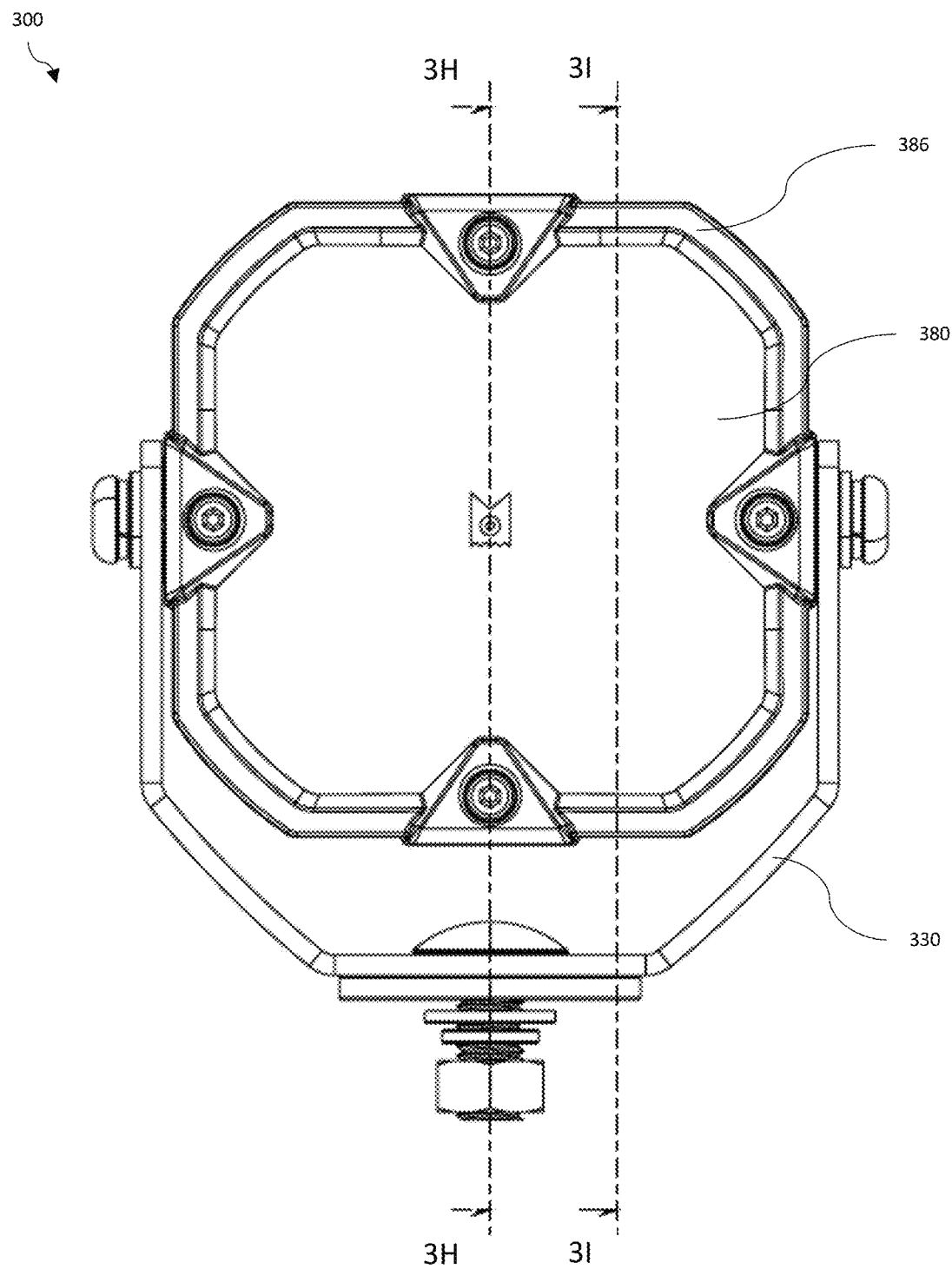
Figure 3H:
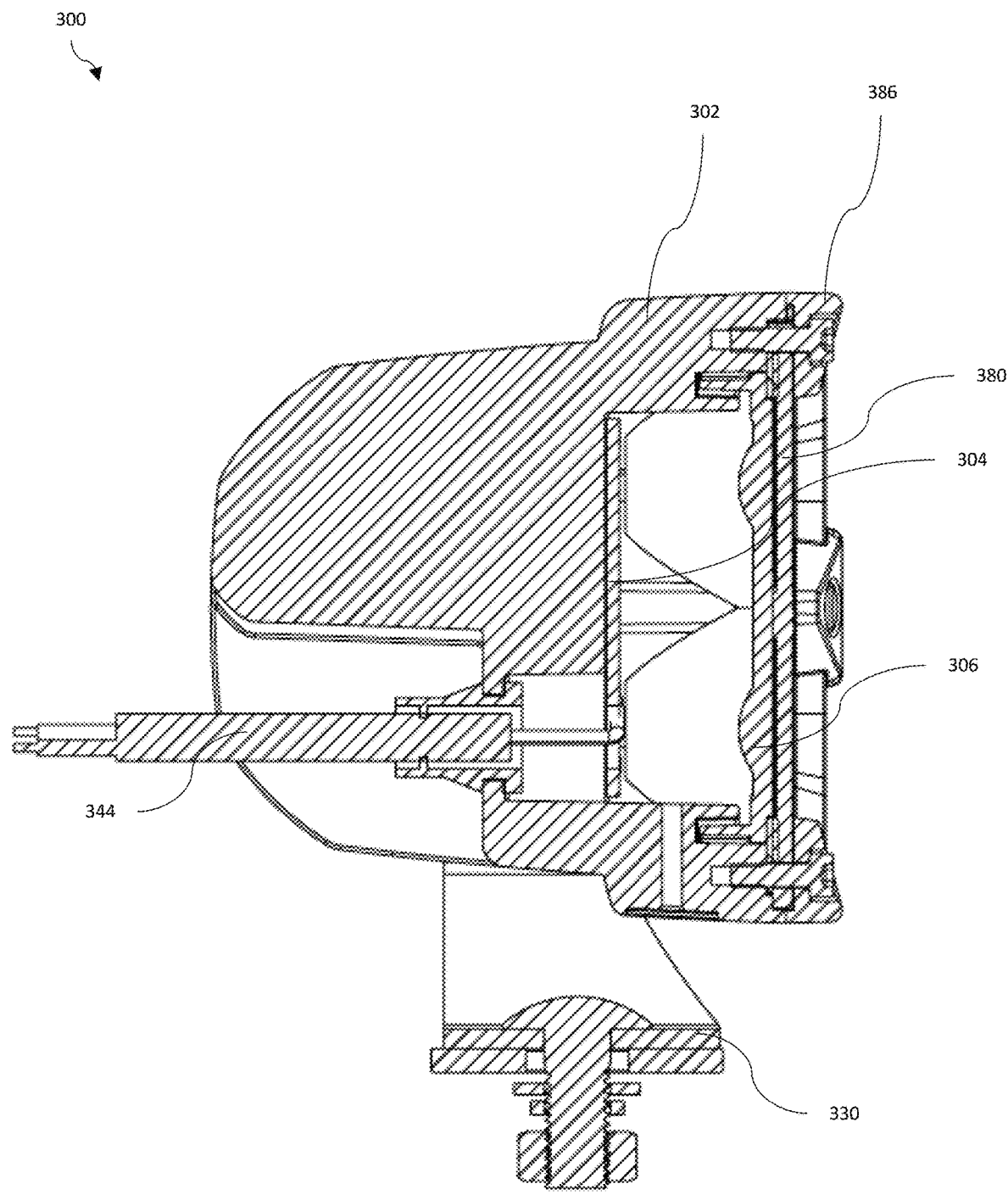
Figure 31:
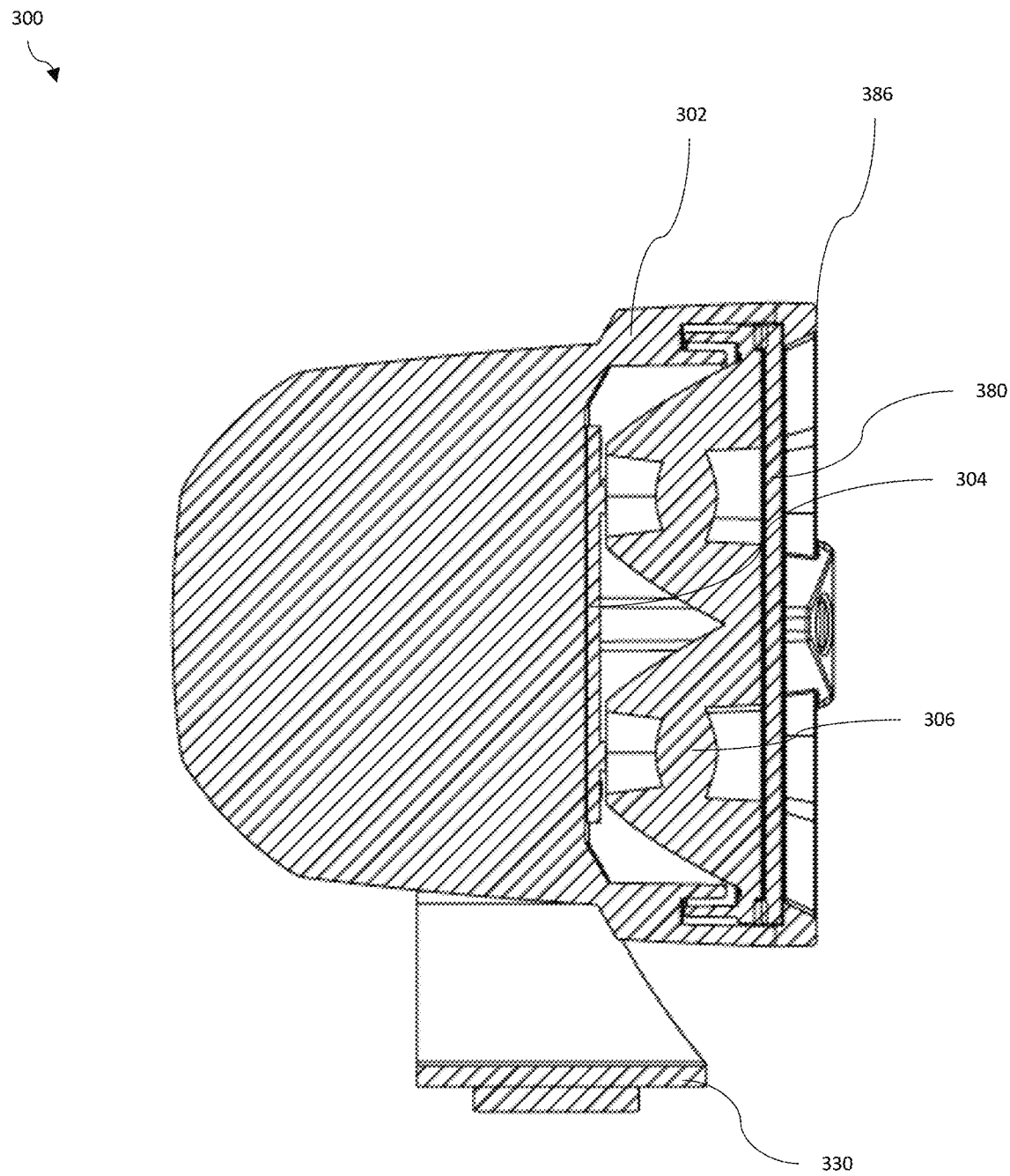

FIG. 3A is a perspective front view of the vehicle light 300 when fully assembled. FIG. 3B is a perspective back view of the vehicle light 300. FIGS. 3C and 3D are exploded views of the vehicle light 300. FIG. 3E is a schematic view of a base unit of the vehicle light 300. FIG. 3F is a schematic exploded view of the function optical unit of the vehicle light 300. FIG. 3G is a schematic front view of the vehicle light 300. FIGS. 3H and 3I are schematic sectional views of the vehicle light 300 along the lines 3H-3H and 3I-3I of FIG. 3G respectively.

The vehicle light 100 includes a base unit 310 and a functional optical unit 308. The base unit 310 includes a housing 302, a light source unit 304 disposed in the housing 302, and a base optical unit 306 disposed in front of the light source unit 304. The light source unit 304 includes four light sources in a two-by-two arrangement. The base optical unit 306 includes four sets of optic devices corresponding to the four light sources. In some embodiment, the base unit 310 may be a sealed unit. The base unit 310 projects intermediate beam patterns from the four light sources. The function optical unit 308 is disposed over the base optical unit 306 of the base unit 310. The function optical unit 308 may be designed to project the intermediate beam patterns into a set of target beam patterns.

The base unit 310 is assembled by attaching the light source unit 304 to the housing 302 and sealing the base optical unit 306 to the housing 302. The housing 302 may include a body 320. The body 320 defines an inner volume 322 and an opening 324. In some embodiments, the body 320 may be formed from a material that is structurally strong with good heat conductivity to provide cooling to the light source unit 304 disposed therein. The housing 302 may include some cooling blades 326 in contact with the body 320. In some embodiments, the cooling blades 326 and the body 320 may be formed in a unitary body. The body 320 may include a groove 328 formed around the opening 324 for receiving the base optical unit 306. In some embodiments, the housing 302 may include a mounting bracket 330 configured to mount the vehicle light 300 on a vehicle.

The light source unit 304 may include a printed circuit board (PCB) 340 having four light sources 342. In some embodiments, each of the four light sources 342 may include one or more LED diodes, laser diodes, or combinations thereof. The four light sources 342 may be identical or different depending on the function of the vehicle light 300. The printed circuit board 340 may include drive circuits and/or control circuits to the light sources 342. In some embodiments, the four light sources 342 may be independently controlled. A cable 344 may be connected to the printed circuit board 340 to provide power and control signal to the light sources 342. In some embodiments, the printed circuit board 340 is attached to the body 320 such that the body 320 and the cooling blades 326 may provide cooling to the printed circuit board 340 and the light sources 342. The printed circuit board 340 may be fixedly attached to the body 320 to position the four light sources 342 in alignment with the base optical unit 306.

The base optical unit 306 may include a lens set 360. When assembled, the lens set 360 fills the opening 324 of the housing 302. In some embodiments, the lens set 360 may include four lenses. In some embodiments, the four lenses of the lens set 360 may be connected into a unitary body. The lens set 360 may be formed by molding. The lens set 360 may be formed from transparent material, such as glass and plastic, and optical silicone.

The lenses in the lens set 360 may be shaped to achieve desired optical functions. The lenses in the lens set 360 may be identical to each other or different from one another depending on the design. Each lens may have an input surface 366 and an exit surface 364. The input surface 366 and the exit surface 364 may be formed on opposite sides of the lens set 360. When assembled, the input surface 366 faces the light sources 332 and the exit surface 364 faces an exterior of the housing 302. In some embodiments, the lens set 360 may include an alignment marker 370. The alignment marker 370 is used to align the lens of the lens set 360 with the corresponding light sources 342. The exit surface 364 may include one or more sections. In some embodiments, the exit surface 364 may include a top section 364$t$. The top section 364$t$ may be a planar surface.

In some embodiments, the lens set 360 may include a connection feature 368 shaped to position the lens set 360 in a target location of the housing 302. In some embodiments, the connection feature 368 may be an outer rim configured to fit with the groove 328 in the housing 302. When the connection feature 368 is inserted in the groove 328, the light sources 342 are aligned with the corresponding lens of the lens set 360. In some embodiments, the connection feature 368 and the housing 302 form a sealed connection so that the light sources 342 and the printed circuit board 340 are sealed within the housing 302. In some embodiments, an adhesive may be applied to the groove 328 and/or the connection feature 368 prior to inserting the connection feature 368 into the groove 328. The adhesive would cure and form an airtight and watertight connection between the lens set 360 and the housing 302.

After assembled, the base unit 310, which includes the housing 302, the light source unit 304 and the base optical unit 306, form a sealed unit. FIG. 3E is a schematic view of the base unit 310. The base unit 310 is configured to project light rays from the light sources 342 to the intermediate beam patterns. In some embodiments, the intermediate beam pattern may be a bunch of parallel beams.

FIG. 3F is a schematic exploded view of the function optical unit 308. The function optical unit 308 includes a functional lens 380. The functional lens 380 may be a transparent panel having an input surface 382 and an exit surface 381. The functional lens 180 may be an injection panel having a shape to match the shape of the body 320. The shape, dimension, patterns, and/or surface features may be designed to distribute input beams from the input surface 382 to target patterns. In some embodiments, the functional lens 380 may include different lens designs for the four light sources 342. In some embodiments, the functional lens 380 may have alignment marks 385 to align the lens patterns of the function lens 380 with the corresponding light source 342. When assembled, the input surface 382 of the functional lens 380 faces the exit surface 364 of the lens set 360 in the base unit 310. The exit beams enter the input surface 382, transmit through the functional lens 380, and exit the exit surface 381 in the target patterns.

The functional lens 380 may be formed from any suitable material. =The functional lens 380 may be formed from transparent material, such as glass, plastic, including, but not limited to polycarbonate (PC), poly (methyl methacrylate) (PMMA), polystyrene (PS), cyclic olefin polymer (COP), cyclic olefin copolymer (COCP), and optical silicone. In some embodiments, the functional lens 380 and the lens set 360 may be formed from the same material. In other embodiments, the functional lens 380 and the lens set 360 may be formed from different materials. For example, the lens set 360 may be formed from optical grade silicone, and the functional lens 380 may be formed from plastic. In some embodiments, the functional lens 380 may include suitable pigments to achieve desired color, for example, red, yellow, blue, suitable for signals, warnings, decoration, and etc.

In some embodiments, the functional optical unit 308 may be removably attached to the base unit 310 by a suitable fastening means, such as screws, clamps, bolts and nuts, adhesives, magnets, clips, threaded connection, and the like. In the embodiment of FIGS. 3A-3B, the functional lens 380 is attached to the base unit 310 by screws 388. The functional lens 380 may include through holes or notches 383. The screws 388 may be secured to the housing 302 via the through holes or notches 383.

In some embodiments, the function optical unit 308 may include a sealing ring 384 disposed between the lens set 360 and the functional lens 380 along an edge of the functional lens 380. The sealing ring 384 may be formed from elastomers. The sealing ring 384 seals the gaps between the lens set 360 and the functional lens 380 to prevent exterior elements. In some embodiments, the functional optical unit 308 further includes an edge ring 386 disposed around the functional lens 380. The edge ring 386 may provide structural support and protection to the functional lens 380.

In some embodiments, the vehicle light 300 may switch between different functions/patterns, such as between a low beam drive pattern and a fog pattern, between an auxiliary upper beam pattern and a front fog pattern, between a front fog beam pattern and a signal pattern, between a low beam pattern and a signal pattern, or between a low beam pattern and a high beam pattern, or the like, by selective lighting different ones of the light sources 342.

In some embodiments, two or more functional lens 380 may be packaged with one base unit 310, allowing the vehicle light 300 to function as different vehicle lights. In some embodiments, the functional lens 380 may include notches or markers for easy alignment during installation and replacement. The fastening means, such as the screws 388, may be designed for repeated tightening and loosening, thereby, switching or replacing the function lens 380 as needed.

As discussed above, optical assembly of the vehicle light 300 is split into the lens set 360 in the base unit 310 and the functional lens 380. The lens set 360 transmits the light rays from the light source 342 into the intermediate patterns and the functional lens 380 transmits the intermediate patterns to target patterns. The functional lens 380 in the functional optical unit 308 may be changed to obtain different beam patterns or a different color.

While the foregoing is directed to embodiments of the present disclosure, other and further embodiments of the disclosure may be devised without departing from the basic scope thereof.

The invention claimed is:

1. A vehicle light, comprising:
a housing;
a light source disposed in the housing;
a first optical device sealingly attached to the housing; and
a second optical device removably attached to the housing, wherein the first optical device is disposed between the light source and the second optical device, and the first optical device and the second optical device are positioned to generate a target beam pattern,
wherein the first optical device comprises a lens having an input surface, an exit surface, and a connection feature, the input surface faces the light source, the exit surface faces the second optical device, and the connection feature is sealed to the housing, the connection feature is a rim around the lens, the housing includes a groove around an opening of the housing, and the rim is inserted into the groove and sealed by an adhesive.

2. The vehicle light of claim 1, wherein the exit surface includes a planar portion, the second optical device is a panel, and the second optical device is disposed on the planar portion of the first optical device.

3. The vehicle light of claim 1, further comprising a connection means removable attach the second optical device to the housing.

4. The vehicle light of claim 3, wherein the connection means comprises two or more screws.

5. The vehicle light of claim 4, further comprising an edge ring disposed around the second optical device, and the two or more screws attach the edge ring and the second optical device to the housing.

6. The vehicle light of claim 3, further comprising a sealing ring disposed between the first optical device and the second optical device.

7. The vehicle light of claim 1, wherein the first optical device is formed from a first material, and the second optical device is formed from a second material.

8. The vehicle light of claim 7, wherein the first material is different from the second material.

9. The vehicle light of claim 8, wherein the first material is optical grade silicone.

10. The vehicle light of claim 1, wherein the first optical device is designed to generate an intermediate beam pattern from light rays of the light source, and the second optical device is designed to transmit the intermediate beam pattern to the target beam pattern.

11. The vehicle light of claim 10, wherein the intermediate beam pattern is a parallel beam pattern.

12. The vehicle light of claim 1, wherein the first optical device comprises a reflector cup.

13. The vehicle light of claim 1, wherein the target beam pattern is a driving pattern meets Motor Vehicle Safety Standard.

14. A vehicle light, comprising:
a base unit, the base unit comprising:
a housing;
a light source disposed in the housing; and
a vertical lens attached to the housing and positioned in front of the light source, wherein the vertical lens is configured to project substantially parallel beams from the light source; and
a functional optical device disposed over the vertical lens of the base unit, wherein the functional optical device is configured to generate a target beam pattern from the substantially parallel beams,
wherein the vertical lens includes an input surface, an exit surface, and a connection feature, the input surface faces the light source, the exit surface faces the functional optical device, and the connection feature is sealed to the housing, the connection feature is a rim around the vertical lens, the housing includes a groove around an opening of the housing, and the rim is inserted into the groove and sealed by an adhesive.

15. The vehicle light of claim 14, wherein the vertical lens is permanently attached to the housing.

16. The vehicle light of claim 14, further comprising a sealing element disposed between the vertical lens and the functional optical device.

17. The vehicle light of claim 14, wherein the vertical lens is formed from a first material, and the functional optical device is formed from a second material.

18. The vehicle light of claim 17, wherein the first material is optical grade silicone.

19. A vehicle light, comprising:
a housing;
a light source disposed in the housing;
a first optical device sealingly attached to the housing;
a second optical device removably attached to the housing, wherein the first optical device is disposed between the light source and the second optical device, and the first optical device and the second optical device are positioned to generate a target beam pattern;
a connection means removable attach the second optical device to the housing, wherein the connection means comprises two or more screws; and
a sealing ring disposed between the first optical device and the second optical device.

20. The vehicle light of claim 19, further comprising:
an edge ring disposed around the second optical device, and the two or more screws attach the edge ring and the second optical device to the housing.

* * * * *